F. A. CUSHMAN.

Assignor to W. A. RUSSELL.

Stock-Grinders for Paper-Pulp.

No. 8,197. Reissued April 23, 1878.

*WITNESSES*

Geo. W. Breck

Wm A Skinkle

*INVENTOR*

*Francis A Cushman.*

*By his Attorneys*

Baldwin Hopkins & Peyton

N. PETERS, PHOTO-LITHOGRAPHER, WASHINGTON, D. C.

UNITED STATES PATENT OFFICE.

FRANCIS A. CUSHMAN, OF LEBANON, NEW HAMPSHIRE, ASSIGNOR TO WILLIAM A. RUSSELL.

IMPROVEMENT IN STOCK-GRINDERS FOR PAPER-PULP.

Specification forming part of Letters Patent No. 156,335, dated October 27, 1874; Reissue No. 8,197, dated April 23, 1878; application filed March 29, 1878.

*To all whom it may concern:*

Be it known that I, FRANCIS A. CUSHMAN, of Lebanon, in the county of Grafton, and State of New Hampshire, have invented certain new and useful Improvements in Machinery for Reducing Wood to Pulp; and that the following, taken in connection with the drawings, is a full, clear, and exact description thereof.

Figure 1:
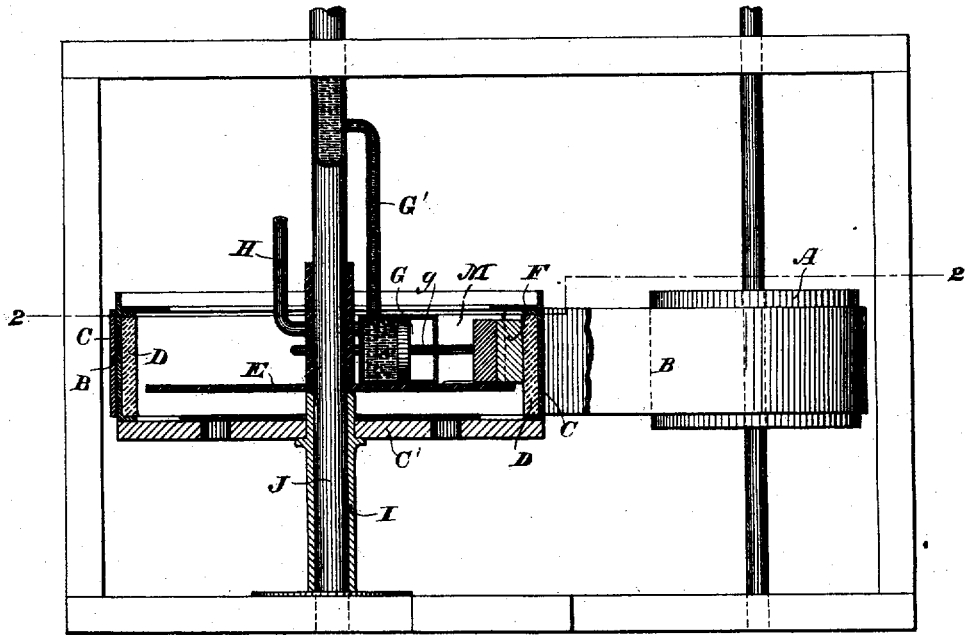
Figure 2:
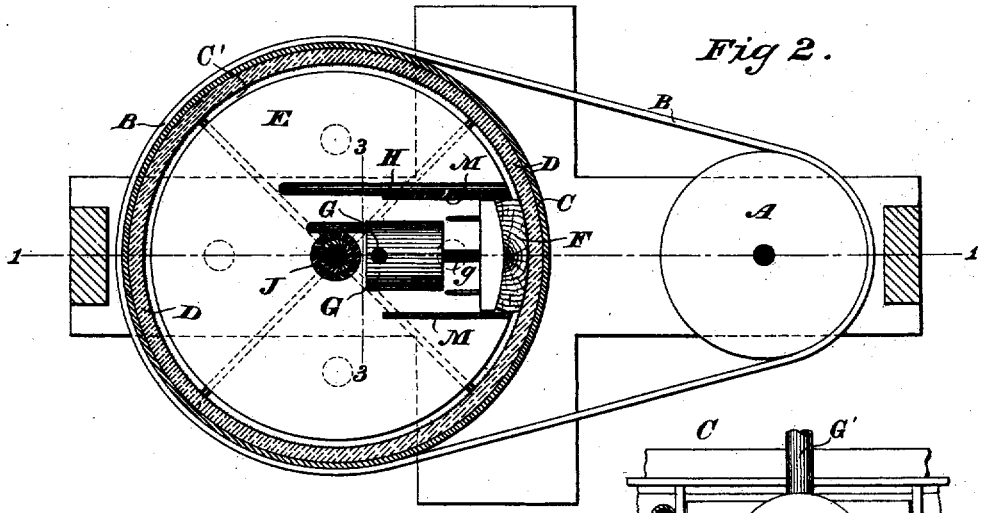
Figure 3:
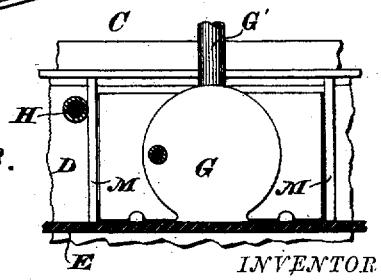

In the drawings, Figure 1 is an elevation of my machinery, partly in section, on the line 1 1 of Fig. 2. Fig. 2 is a plan thereof, partly in section, on the line 2 2 of Fig. 1; and Fig. 3 a vertical transverse section, on an enlarged scale, on the line 3 3 of Fig. 2.

The machinery consists, essentially, of a revolving drum, the concavity of which is provided with a proper grinding-surface, in combination with means for supporting a block of wood, the two being so arranged that the wood may be forced against the grinding-surface in lines leading from the interior to the periphery of the drum, as contrasted with a progress of the wood toward a hollow grinding-surface, in lines parallel to the axis thereof, or nearly so.

The drum shown in the drawings is composed of a cast-iron hoop, C, the concavity or interior surface of which is filled with a grinding material composed of a plastic composition, formed chiefly of emery, quartz, or corundum, such compositions being well known. This filling is represented at D, and, when in place, forms a hollow cylindrical grinding-surface. This drum is supported by means of a disk, C′, secured to its lower edge, and mounted upon a sleeve, I, surrounding a shaft or column, J, so that it may revolve and be put in revolution, the plan shown in the drawings for revolving it being a belt, B, surrounding both the drum and a belt-pulley, A, which latter may be revolved by any appropriate machinery.

Within the drum there is secured to the shaft or column a table, E, provided with upright walls M M, the table and walls forming the bottom and two sides of a box, within which the blocks of wood to be ground are placed, and by which the blocks are supported in such manner that they may be fed against the grinding-surface in lines leading from the interior of the drum toward the periphery thereof.

The blocks of wood F, when supported in this feed-box, composed of the table and its walls, are, as shown in the drawings, to be fed up against the grinding-surface by means of a rod or piston-rod, *g*, which is attached to a piston within the cylinder G. This piston may be caused to feed the wood to be ground by applying pressure to it, either by means of a stand-pipe, G′, properly connected with the cylinder, and supplied with water, or by means of a force-pump injecting water into the cylinder.

A pipe, H, supplies water to the wood and grinding-surface in a manner usual in machines for reducing wood to pulp by grinding.

When blocks of wood are laid on the table between the walls, and pressure applied to the piston, the blocks will be forced against the concave surface, and, as it revolves, the blocks will be reduced to pulp.

I do not claim a concave grinding-surface, either cylindrical or conical, by itself; nor a concave grinding-surface provided with means for supporting and feeding the wood in lines parallel to the axis thereof; nor do I claim a feeding-box by itself, as such boxes are old; neither do I claim any special apparatus for causing the wood to advance or be fed toward the grinding-surface; nor do I claim any particular kind of grinding-surface; but I do claim—

1. The combination of a concave revolving grinding-surface with a feed-box so located therein, substantially as specified, that blocks of wood may be supported and fed therein in lines leading from the interior of said concave surface toward the periphery thereof, the combination being and operating substantially as specified.

2. The combination of a concave revolving grinding-surface with a feed-box located therein, and with means, substantially such as are specified, for feeding the wood in said feed-box toward the concave grinding-surface in lines leading from the interior to the periphery thereof, the combination being and acting substantially as hereinbefore described.

FRANCIS A. CUSHMAN.

Witnesses:
JABEZ S. HOLMES,
J. HENRY TAYLOR.